Figure 1:
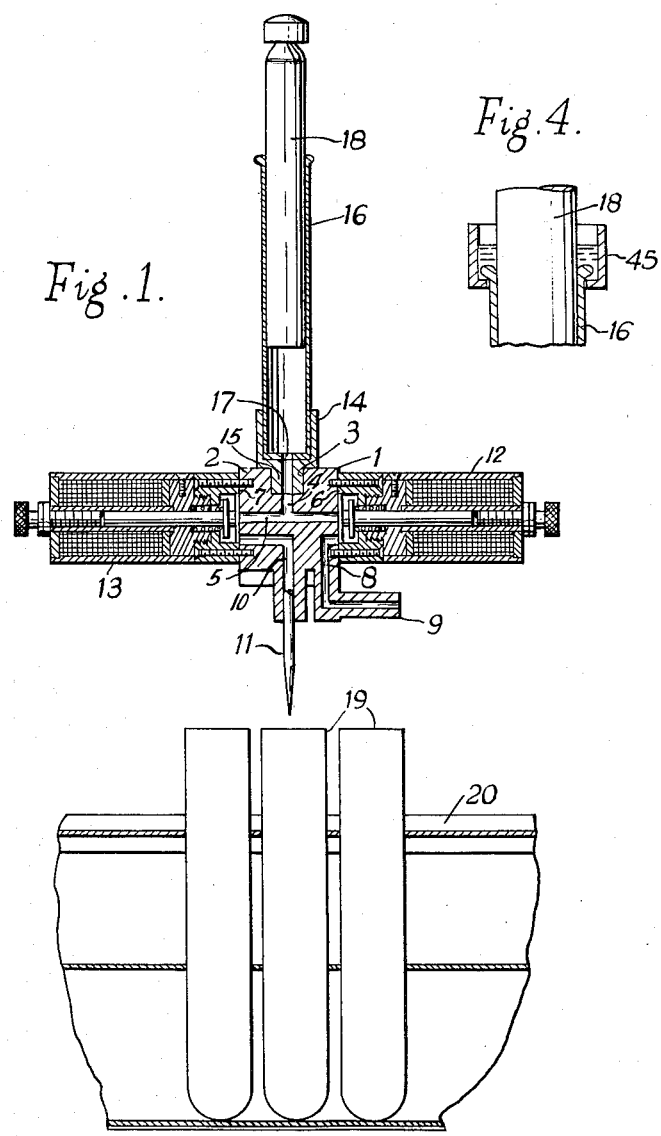

Dec. 26, 1961   P. R. MONK ETAL   3,014,508
LIQUID DISPENSING APPARATUS

Filed May 5, 1958   3 Sheets-Sheet 3

INVENTORS
Philip Reginald Monk and
Norman Clark Green and Ronald Hutt
BY
Karl W. Flocks
ATTORNEY United States Patent Office
3,014,508
Patented Dec. 26, 1961

3,014,508
LIQUID DISPENSING APPARATUS
Philip Reginald Monk, 91a Eastbury Road, Oxhey, near Watford, England; Norman Clark Green, 10 Watery Lane, Ulverston, England; and Ronald Hutt, 33 Hawthorn Ave., Ulverston, England
Filed May 5, 1958, Ser. No. 732,942
Claims priority, application Great Britain May 6, 1957
3 Claims. (Cl. 141—129)

This invention relates to liquid dispensing units and is particularly although not exclusively concerned with liquid dispensing apparatus comprising at least one such unit for successively dispensing the same predetermined quantity of liquid into a plurality of containers.

It is often desirable in laboratories or for the control of manufacturing processes to subject a plurality of samples to a test operation involving the reaction of the sample with a predetermined quantity of one or more liquid reagents. If such operations are carried out by hand considerable time is taken and accuracy in repetition tends to become lost.

It is therefore an object of the present invention to provide an improved liquid dispensing unit which is capable of accurately dispensing a predetermined quantity of a liquid.

A further object of the invention is the provision of liquid dispensing apparatus incorporating at least one liquid dispensing unit which is capable automatically of dispensing predetermined quantities of liquid successvely into a plurality of containers.

In its broadest aspect the present invention provides a liquid dispensing unit comprising a liquid measuring chamber communicating through a valve block respectively with inlet and outlet valves, an inlet and an outlet for liquid under pressure being provided in the valve block and communicating respectively with said inlet and outlet valves.

The inlet and outlet valves may be operated mechanically or pneumatically but are preferably electromagnetic of the type disclosed in the specification of application Serial No. 629,437, now abandoned. The valve block may also be of the type disclosed in the above-mentioned specification.

The measuring chamber preferably comprises a cylinder arranged above the valve block with its longitudinal axis vertical, the lower end of the cylinder opening into a passage in the valve block communicating with said inlet and outlet valves and the upper end of the cylinder being open and a weighted piston being movable under gravity in the cylinder. Where the valves are electro-magnetic the piston is preferably arranged to operate an electric switch when the cylinder has received its predetermined quantity of liquid through the inlet valve in order to close the inlet valve and open the outlet valve so that said quantity of liquid is expelled through the outlet as the piston falls in the cylinder.

According to another aspect of the present invention there is provided liquid dispensing apparatus comprising at least one liquid dispensing unit according to the present invention, means for moving a plurality of containers successively into a liquid receiving position adjacent the outlet of the unit and means for causing the measuring chamber of the unit to receive a predetermined quantity of liquid and to expel said quantity into each container while the latter is in said position when the inlet of the unit is coupled with a source of said liquid.

Figure 2:
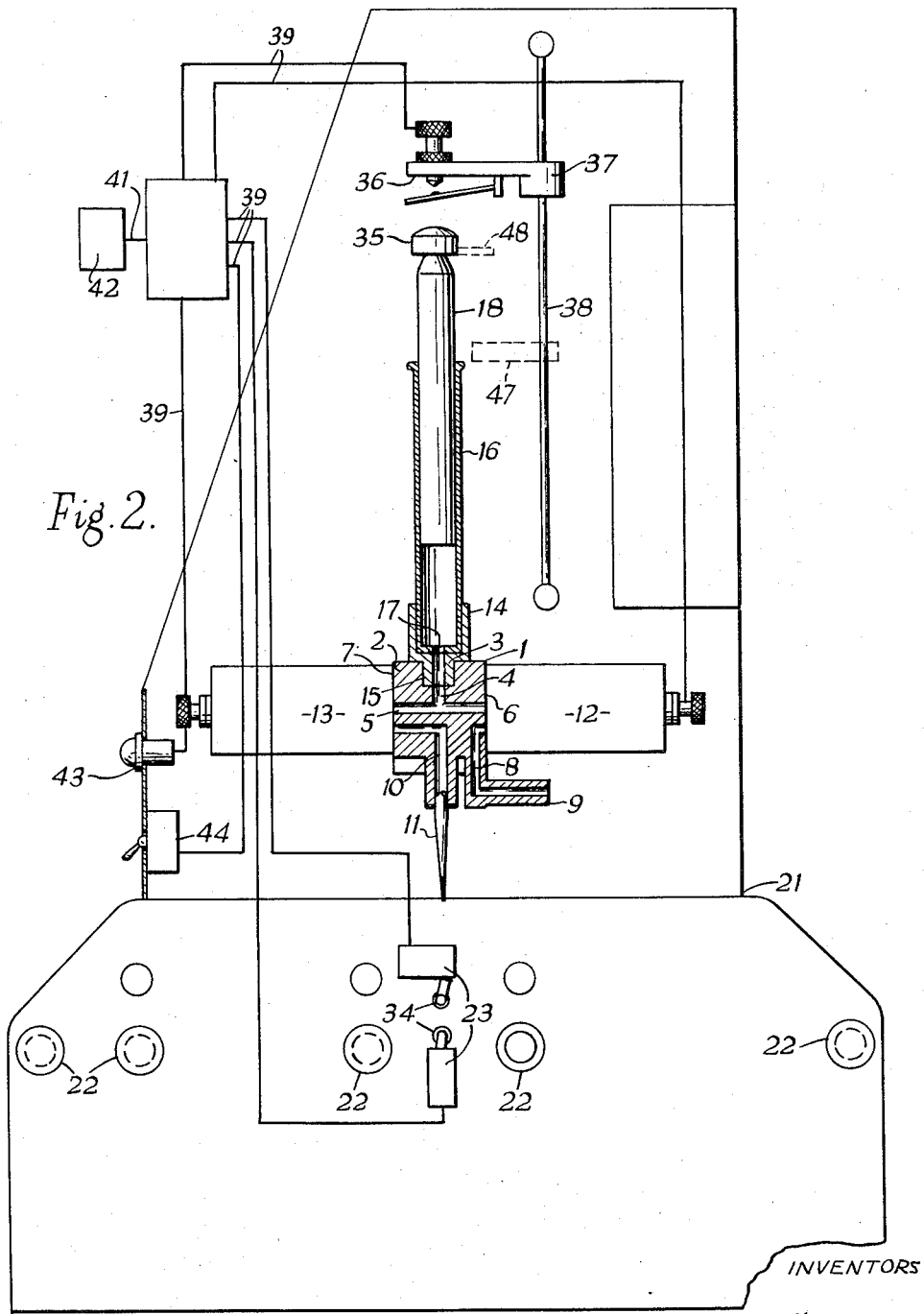
Figure 3:
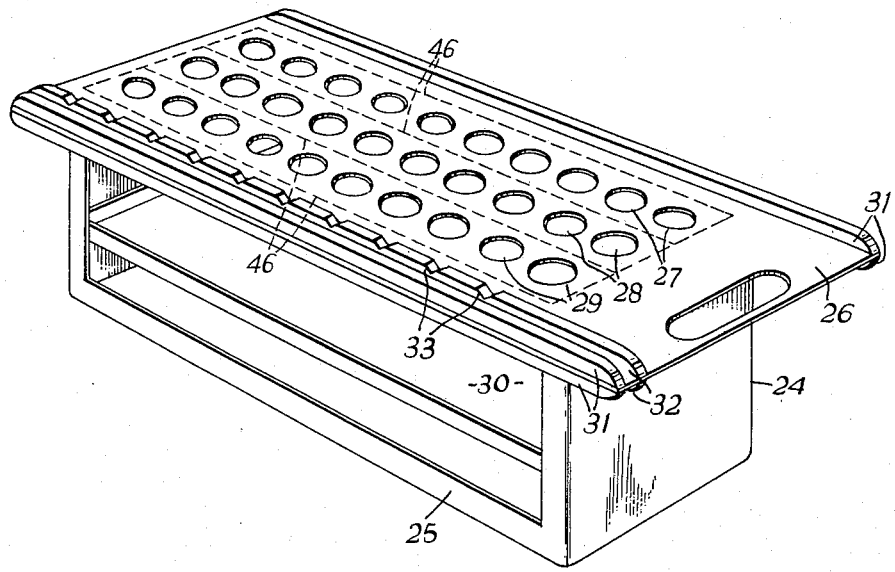

The invention will now be described with reference to the accompanying drawings in which:

FIG. 1 shows diagrammatically in part vertical section a liquid dispensing unit according to the invention arranged above a rack containing a number of test tubes, FIG. 2 is a vertical section through a liquid dispensing apparatus incorporating a plurality of liquid dispensing units, FIG. 3 shows in perspective a test tube rack for use with the apparatus of FIG. 2 and FIG. 4 shows in part vertical section a modification of part of the unit to a larger scale.

Referring to FIGS. 1 and 2 of the drawings a liquid dispensing unit is indicated generally at 1. This unit comprises a valve block 2 of generally rectangular shape and formed with a recess 3 in its upper face. The recess 3 communicates with a passage 4 which in turn communicates with a passage 5 extending transversely across the block 2 and opening into both side faces 6 and 7 thereof. An inlet passage 8 has one end opening into the face 6 and its other end forming an inlet 9 for liquid under pressure. A passage 10 has one end opening into the face 7 and its other end communicating with an outlet jet 11.

An electro-magnetically operated inlet valve 12 is mounted on the face 6 of the block 2 and a similar outlet valve 13 is mounted on the face 7. These valves are of the type disclosed in the specification of application Serial No. 629,437.

A cup-shaped support 14 has its lower reduced diameter part 15 located within the recess 3. The part 15 is formed with a central bore to communicate with the passage 4 and the cup supports the lower end of a glass cylinder 16 constituting a measuring chamber. The lower end of the cylinder 16 is formed with an aperture 17 communicating with the passage 5 and its upper end is open to receive a weighted piston 18 as a close sliding fit therein. When the cylinder 16 is of metal the cup-shaped support 14 is formed integrally with it.

In operation the inlet 9 is connected to a liquid reservoir capable of supplying liquid under pressure thereto and upon energisation of the inlet valve 12 liquid flows through the passage 8, the valve 12 and the passage 5 into the cylinder 16 to cause the piston 18 to rise against gravity. When a predetermined quantity of liquid has passed into the cylinder 16 (which may for example be measured by the rise of the piston 18) the inlet valve 12 is de-energised. The predetermined quantity of liquid in the cylinder 16 may at any subsequent time be expelled through the jet 11 for example into a test tube such as 19 held in a rack 20 upon energisation of the outlet valve 13.

FIG. 2 of the drawings shows diagrammatically part of a liquid dispensing apparatus incorporating three liquid dispensing units only one of which is shown. The apparatus comprises a sheet metal casing 21 the upper part of which supports the liquid dispensing units and the lower part of which is provided with two sets of guide wheels one set of which is shown at 22 and locating means 23 comprising an electric switch for a test tube rack 24 (FIG. 3).

The rack 24 comprises a metal frame 25 and a cover plate 26 extending both longitudinally and transversely beyond the periphery of the framework 25. The cover plate 26 is formed with three rows 27, 28 and 29 of circular apertures spaced apart by distances equal to the spacing of the liquid dispensing units. The apertures are of a size to receive test tubes to be used with the rack and the lower ends of the test tubes rest upon a tray 30 which is located within the framework 25 and may be adjustable towards and away from the cover plate 26. The side edges of the cover plate 26 are each provided on the upper and lower surfaces with guide strips 31 for engagement with the guide wheels such as 22 in the casing 21. A second pair of locating strips 32 is provided on the upper and lower surfaces of a cover plate 26 at a position spaced inwardly from one of its side edges. The strips 32 are formed with notches 33 opposite each series of three apertures 27, 28 and 29 for engagement by rollers 34 and the locating means 23.

The upper end 35 of each of the pistons 18 is arranged to close an adjustable electric contact 36 mounted on a block 37 slidable on a guide rod 38.

The relays 12 and 13, the contacts 36 and the electric switches 23 are connected by electric cables all indicated generally at 39 with an electronic control circuit indicated by a block 40 which does not form part of the present invention and which is connected by a cable 41 with a source 42 of electric current.

In operation the electric switch included in the locating means 23 energises the inlet valves 12 when the rollers 34 engage in the notches 33 of the rack as the latter full of test tubes is pushed manually through the apparatus. Upon energization of the inlet valves 12 as described above a predetermined quantity of liquid from a reservoir (not shown) flows into the cylinders 16 of the units to cause the pistons 18 to rise. The inlet valves 12 are de-energised and the outlet valves 13 energised when the upper ends 35 of the pistons 18 close the contacts 36 to cause the liquid in the cylinders 16 to be expelled from the jets 11 into the test tubes in the rack 24. The outlet valves 13 are de-energised after a time delay sufficient to enable the pistons 18 to reach the lower ends of the cylinders 16. It will be appreciated that the quantity of liquid is determined by the position of the contacts 36 and may be accurately adjusted.

The operation described above is repeated each time the rack 24 is moved through the apparatus so that a different notch 33 engages with the rollers 34. The locating means 23 are preferably locked for part of the sequence described above to prevent accidental movement of the rack.

The casing 21 carries an indicating pilot lamp 43 which is electrically connected with the outlet valve 13 to indicate when a cycle of operation of the unit has been completed. A two-way switch 44 is provided and connected with relays and other control elements for the apparatus so that in a first position it enables semi-automatic operation to be effected as described above and in a second position so that manual operation of the units can be effected.

Referring to FIG. 4 of the drawings this shows a modification to the upper end of the cylinder 16 comprising a collar 45 sealed thereon. During operation the space within the collar is provided with a small quantity of liquid to prevent crystallisation due to evaporation from the thin film of liquid which extends between the cylinder and the piston. The collar also serves to retain any slow upward leak of liquid.

In a further modification the rack shown in FIG. 3 is provided with removable panels the positions of which are indicated by dotted lines 46 so that each row of test tubes may be separately removed therefrom.

If desired a further switch may be added to the units to signal the end of the downwardly, that is, delivery movement of the piston and to trigger off the next operation in the sequence. The position of this switch has been indicated diagrammatically at 47 and for example may be operated by a member indicated diagrammatically at 48 secured to the piston 18.

We claim:
1. A liquid dispensing unit comprising a vertically disposed liquid measuring cylinder, a weighted piston movable under gravity in the cylinder, a valve block disposed below said cylinder, a passage through said valve block opening respectively into first and second faces thereof, means communicating between the lower end of said cylinder and said passage through said valve block, an inlet for liquid under pressure in said valve block and communicating with said first face, an outlet for liquid under pressure in said valve block and communicating with said second face, electrically operable inlet valve means associated with said first face and capable of obturating said passage and said inlet and electrically operable outlet valve means associated with said second face and capable of obturating said passage and said outlet and electric switch means capable of being operated by said piston when said cylinder has received a predetermined quantity of liquid through said inlet valve means in order successively to initiate operation of said inlet valve means to obturate said passage and said inlet and to initiate operation of said outlet valve means to cause said quantity of liquid to be expelled through said outlet as the piston falls in the cylinder.

2. Liquid dispensing apparatus comprising at least one liquid dispensing unit according to claim 1, means for moving a plurality of containers successively into a liquid receiving position adjacent said outlet, a source of liquid, means for causing said cylinder to receive a predetermined quantity of said liquid and to expel said quantity into each container while the latter is in said position and said inlet is coupled with said source.

3. A liquid dispensing unit comprising a vertically disposed liquid measuring cylinder, a weighted piston movable under gravity in the cylinder, a valve block disposed below said cylinder, a passage through said valve block opening respectively into first and second faces thereof, means communicating between the lower end of said cylinder and said passage through said valve block, an inlet in said valve block for liquid under pressure, said inlet communicating with said first face, an outlet in said valve block for liquid under pressure, said outlet communicating with said second face, inlet valve means associated with said first face and capable of obturating said passage and said inlet and outlet valve means associated with said second face and capable of obturating said passage and said outlet.

References Cited in the file of this patent
UNITED STATES PATENTS

| | | |
|---|---|---|
| 1,158,029 | Dantsizen | Oct. 26, 1915 |
| 1,528,978 | McClellan | Mar. 10, 1925 |
| 1,795,307 | Johnston | Mar. 10, 1931 |
| 2,380,884 | Von Stoeser et al. | July 31, 1945 |
| 2,709,538 | Harrington | May 31, 1955 |